(12) United States Patent
Ishikawa et al.

(10) Patent No.: US 12,428,985 B2
(45) Date of Patent: Sep. 30, 2025

(54) ENGINE-MOUNTED AUTONOMOUS FLYING DEVICE

(71) Applicant: ISHIKAWA ENERGY RESEARCH CO., LTD., Ota (JP)

(72) Inventors: Mitsuru Ishikawa, Ota (JP); Hidetaka Kayanuma, Ota (JP)

(73) Assignee: ISHIKAWA ENERGY RESEARCH CO., LTD., Gunma (JP)

( * ) Notice: Subject to any disclaimer, the term of this patent is extended or adjusted under 35 U.S.C. 154(b) by 52 days.

(21) Appl. No.: 17/971,831

(22) Filed: Oct. 24, 2022

(65) Prior Publication Data

US 2023/0042223 A1 Feb. 9, 2023

Related U.S. Application Data

(63) Continuation of application No. 16/651,173, filed as application No. PCT/JP2018/035952 on Sep. 27, 2018, now abandoned.

(30) Foreign Application Priority Data

Sep. 27, 2017 (JP) ................................. 2017-185764

(51) Int. Cl.
*F02B 75/28* (2006.01)
*B64D 27/33* (2024.01)
(Continued)

(52) U.S. Cl.
CPC ............ *F02B 75/282* (2013.01); *B64D 27/33* (2024.01); *B64U 30/29* (2023.01); *B64U 50/11* (2023.01);
(Continued)

(58) Field of Classification Search
CPC .................................................... B64U 50/11
See application file for complete search history.

(56) References Cited

U.S. PATENT DOCUMENTS 8,128,033 B2 3/2012 Raposo
8,725,314 B2 5/2014 Chaperon et al.
(Continued)

FOREIGN PATENT DOCUMENTS

CN 104554724 A 4/2015
CN 104859853 A 8/2015
(Continued)

OTHER PUBLICATIONS

International Search Report dated Dec. 18, 2018, issued in counterpart International Application No. PCT/JP2018/035952.
(Continued)

*Primary Examiner* — Joseph W Sanderson
(74) *Attorney, Agent, or Firm* — WHDA, LLP

(57) ABSTRACT

An autonomous flying device achieving a large payload and a long continuous flight time and also accurately adjust position and orientation while flying. The device includes: a main rotor and the like that provide main thrust; a sub rotor and the like that controls the orientation; an engine that generates energy for rotating the main rotor and the like and the sub rotor and the like; and an arithmetic control device that controls rotation of the sub rotor and the like. Also, the main rotor and the like are rotated by being drivingly connected to the engine, whereas the sub rotor and the like are rotated by motors driven by electric power generated from generator and the like operated by the engine. Further, when orientation control to tilt the fuselage is performed, the arithmetic control device increases the output distribution ratio of the sub rotor to above the output distribution ratio of the sub rotor when hovering is performed.

12 Claims, 8 Drawing Sheets

(51) Int. Cl.
  *B64U 10/16*   (2023.01)
  *B64U 30/29*   (2023.01)
  *B64U 50/11*   (2023.01)
  *B64U 50/13*   (2023.01)
  *B64U 50/27*   (2023.01)

(52) U.S. Cl.
  CPC ............ *B64U 50/13* (2023.01); *B64U 50/27* (2023.01); *B64U 10/16* (2023.01)

(56) References Cited

U.S. PATENT DOCUMENTS

| | | | |
|---|---|---|---|
| 9,902,493 | B2 | 2/2018 | Simon et al. |
| 10,604,242 | B2 | 3/2020 | Chan |
| 11,095,129 | B2 | 8/2021 | Kelly-Morgan et al. |
| 2010/0301168 | A1 | 12/2010 | Raposo |
| 2011/0301787 | A1 | 12/2011 | Chaperon et al. |
| 2012/0056041 | A1 | 3/2012 | Rhee et al. |
| 2016/0325829 | A1 | 11/2016 | Ahn et al. |
| 2017/0029131 | A1 | 2/2017 | Steinwandel et al. |
| 2017/0066531 | A1 | 3/2017 | McAdoo |
| 2017/0253331 | A1 | 9/2017 | Nakashima |
| 2018/0029703 | A1 | 2/2018 | Simon et al. |
| 2018/0030887 | A1 | 2/2018 | Zhao et al. |
| 2018/0205242 | A1 | 7/2018 | Kelly-Morgan et al. |
| 2018/0244377 | A1 | 8/2018 | Chan |
| 2019/0263519 | A1 | 8/2019 | Argus |
| 2024/0343425 | A1* | 10/2024 | Ishikawa ................ B64U 10/16 |
| 2025/0033761 | A1* | 1/2025 | Ishikawa ................ B64C 27/10 |

FOREIGN PATENT DOCUMENTS

| | | | | |
|---|---|---|---|---|
| CN | 105035328 | A | 11/2015 | |
| CN | 105539828 | A | 5/2016 | |
| CN | 205602114 | U | 9/2016 | |
| CN | 106043679 | A | 10/2016 | |
| CN | 108100256 | A | 6/2018 | |
| DE | 102017111626 | A1 | 7/2017 | |
| EP | 1983215 | A1 | 10/2008 | |
| EP | 2762704 | A1 * | 8/2014 | ................ F02B 3/06 |
| EP | 3124379 | A1 | 2/2017 | |
| EP | 4501795 | A1 * | 2/2025 | ............ B64C 27/08 |
| GB | 2556092 | A | 5/2018 | |
| JP | S56-159519 | A | 12/1981 | |
| JP | S63-176628 | A | 7/1988 | |
| JP | H01-201294 | A | 8/1989 | |
| JP | H05-111174 | A | 4/1993 | |
| JP | H09-182371 | A | 7/1997 | |
| JP | 2002-347698 | A | 12/2002 | |
| JP | 2011-251678 | A | 12/2011 | |
| JP | 2012-51545 | A | 3/2012 | |
| JP | 2014-240242 | A | 12/2014 | |
| JP | 2015-137092 | A | 7/2015 | |
| JP | 2016-180336 | A | 10/2016 | |
| JP | 2017074804 | A | 4/2017 | |
| JP | 2017-154654 | A | 9/2017 | |
| KR | 20170061884 | A * | 6/2017 | |
| WO | 2013/047878 | A1 | 4/2013 | |
| WO | 2017/126584 | A1 | 7/2017 | |
| WO | 2017/035593 | A1 | 9/2017 | |

OTHER PUBLICATIONS

Office Action dated May 7, 2020, issued in counterpart JP Application No. 2020-005683, with English Translation.
Office Action dated Jun. 23, 2020, issued in counterpart JP Application No. 2020-005683, with English Translation.
Office Action dated Jul. 13, 2021, issued in counterpart JP application No. 2020-156161, with English translation.
Office Action dated May 17, 2022, issued in counterpart JP application No. 2021-121104, with English translation.
Non-Final Office Action issued in U.S. Appl. No. 16/651,173.
Office Action dated Jun. 30, 2022, issued in counterpart Chine Patent Application No. 201880024839.5. (7 pages).
Office Action dated Oct. 3, 2023, issued in counterpart JP application No. 2023-003274 with English translation. (7 pages).
Office Action dated Dec. 20, 2022, issued in counterpart JP application No. 2022-095976, with English translation. (7 pages).
Office Action dated May 28, 2024, issued in counterpart JP application No. 2023-201671, with English translation. (7 pages).

\* cited by examiner

ENGINE-MOUNTED AUTONOMOUS FLYING DEVICE

CROSS-REFERENCE TO RELATED APPLICATIONS

This application is a divisional/continuation of U.S. application Ser. No. 16/651,173, filed on Jun. 12, 2020, which is a 371 of International Application No. PCT/JP2018/035952, filed on Sep. 27, 2018, which is based upon and claims the benefit of priority from Japanese Patent Application No. 2017-185764, filed on Sep. 27, 2017, the entire contents of which are incorporated herein by reference.

TECHNICAL FIELD

The present invention relates to an engine-mounted autonomous flying device and relates in particular to a so-called hybrid engine-mounted autonomous flying device that drivingly drives main rotors with an engine and rotates sub rotors with electric power obtained from generators driven by the engine.

BACKGROUND ART

Autonomous flying devices have heretofore been known which are capable of unmanned flight in the air. These autonomous flying devices are capable of flying in the air by using thrust from rotors rotating about vertical axes.

Possible application fields of such autonomous flying devices include, for example, the fields of transportation, surveying, photo/video shooting, and so on. In the case of using an autonomous flying device in such a field, the flying device is equipped with a surveying device or an image capturing device. By using a flying device is used in such a field, it is possible to cause the flying device to fly over an area where humans cannot enter, and transport an article to, shoot a photo or video of, or survey that area. Inventions related to such autonomous flying devices are disclosed in Patent Literatures 1 and 2, for example.

A general autonomous flying device rotates the above-mentioned rotors with electric power supplied from a rechargeable battery mounted on the flying device. However, the supply of electric power from the rechargeable battery does not always provide a sufficient amount of energy supply. In view of this, autonomous flying devices have emerged on which an engine is mounted to achieve a continuous flight over a long period of time. Such an autonomous flying device rotates generators with driving force from the engine, and rotationally drives the rotors with electric power generated by the generators. An autonomous flying device with such a configuration is called a series type drone since the engine and the generators are connected in series on the paths through which to supply energy to the rotors from the mechanical power source. By perform photo/video shooting or surveying with such an autonomous flying device, it is possible to perform photo/video shooting or surveying over a vast area. An engine-mounted flying device is disclosed in Patent Literature 3, for example.

CITATION LIST

Patent Literatures

[Patent Literature 1] Japanese Patent Application Publication No. 2012-51545

[Patent Literature 2] Japanese Patent Application Publication No. 2014-240242

[Patent Literature 3] Japanese Patent Application Publication No. 2011-251678

SUMMARY OF INVENTION

Technical Problems

Considering the current situation with the expanding use of autonomous flying devices, autonomous flying devices are required to increase their loadable package weight, that is, to increase their payload. Further, autonomous flying devices are also required to fly continuously over a long period of time, in order to fly a long distance.

However, battery-driven autonomous flying devices having only a rechargeable battery as the driving energy source for their rotors have a problem of small payload and short continuous flight time since the energy obtained from the battery is not so large. For example, the payload of a battery-driven autonomous flying device is about 10 kg, and its continuous flight time is about 20 minutes.

Meanwhile, a series type autonomous flying device, which rotates its rotors by using electric power generated with an engine, can achieve a relatively large payload and a relatively long continuous flight time since the driving source is the engine. For example, the payload of a series type autonomous flying device is about 20 kg, and its continuous flight time is about one hour. However, in a series type autonomous flying device, the energy to be transmitted to its rotors passes from an engine through generators, power conditioners, and motors. This results in an energy loss corresponding to the efficiency of the generators and the power conditioners. Thus, series type autonomous flying devices have a problem in that the energy efficiency as a whole is not high and thus it is not easy to increase the payload.

Further, hybrid autonomous flying devices have been developed which are autonomous flying devices including engine-driven rotors and motor-driven rotors. It is, however, not easy to change the orientation of an autonomous flying device 10 and do the like in a stable manner while enhancing the operation efficiency.

The present invention has been made in view of the above circumstances, and an object thereof is to provide an autonomous flying device capable of achieving a large payload and a long continuous flight time and also accurately adjusting its position and orientation while flying.

Solution to Problems

An engine-mounted autonomous flying device according to the present invention includes: a main rotor that gives main thrust to a fuselage; a sub rotor that controls orientation of the fuselage; an engine that generates energy for rotating the main rotor and the sub rotor; and an arithmetic control device that controls rotation of the sub rotor, and the main rotor is rotated by being drivingly connected to the engine, the sub rotor is rotated by a motor driven by electric power generated from a generator operated by the engine, and when orientation control to tilt the fuselage is performed, the arithmetic control device increases an output distribution ratio of the sub rotor to above an output distribution ratio of the sub rotor when hovering is performed.

Also, in engine-mounted autonomous flying device according to the present invention, the engine-mounted autonomous flying device according to claim 1, wherein the arithmetic control device sets the output distribution ratio of the sub rotor at 10% or more and 30% or less when the orientation control is performed.

Also, the engine-mounted autonomous flying device according to the present invention further includes: an electric power converter that converts the electric power generated from the generator; and a capacitor that stores electric power outputted from the electric power converter, and the arithmetic control device charges the capacitor when the hovering is performed, and supplies electric power discharged by the capacitor to the motor when the orientation control is performed.

Also, in the engine-mounted autonomous flying device according to the present invention, a rotational speed of the engine when the hovering is performed and a rotational speed of the engine when the orientation control is performed are substantially same.

Also, in the engine-mounted autonomous flying device according to the present invention, the engine and the main rotor are drivingly connected via a belt.

Also, in the engine-mounted autonomous flying device according to the present invention, the engine has a first engine part having a first piston that reciprocates and a second engine part having a second piston that reciprocates while facing the first piston.

Also, in the engine-mounted autonomous flying device according to the present invention, the first piston and the second piston reciprocate inside a continuous cylinder.

Also, in the engine-mounted autonomous flying device according to the present invention, the first piston reciprocates inside a first cylinder, and the second piston reciprocates inside a second cylinder formed as a separate body from the first cylinder.

Also, in the engine-mounted autonomous flying device according to the present invention, the sub rotor is attached to a tip side of a sub arm extending outward from a portion where the engine is arranged, and the main rotor is attached to a tip side of a main arm being longer than the sub arm and extending outward from the portion where the engine is arranged.

Also, in the engine-mounted autonomous flying device according to the present invention, driving force is transmitted to the main rotor via an engine-side pulley attached to a shaft extending from a crankshaft in the engine to an outside, a rotor-side pulley attached to the main rotor, and a belt looped between the engine-side pulley and the rotor-side pulley.

Also, in the engine-mounted autonomous flying device according to the present invention, when a direction in which a first engine part and a second engine part constituting the engine are arrayed is a first direction, and a direction which is perpendicular to the first direction is a second direction, the main rotor has a first main rotor driven by the first engine part and arranged on an outside along the first direction, and a second main rotor driven by the second engine part and leveled at a position opposite the first main rotor, and the sub rotor has, on the first main rotor side, a first sub rotor arranged on the outside along the second direction, and the second sub rotor arranged along the second direction at a position opposite the first sub rotor, and, on the second main rotor side, a third sub rotor arranged on the outside along the second direction, and the fourth sub rotor arranged along the second direction at a position opposite the third sub rotor.

Also, in the engine-mounted autonomous flying device according to the present invention, the engine has a crankshaft with a first balance mass formed thereon, and a balancer shaft with a second balance mass formed thereon at a symmetric position relative to the first balance mass, and the main rotor is rotated by driving force from the crankshaft and the balancer shaft.

Advantageous Effects of Invention

An engine-mounted autonomous flying device according to the present invention includes: a main rotor that gives main thrust to a fuselage; a sub rotor that controls orientation of the fuselage; an engine that generates energy for rotating the main rotor and the sub rotor; and an arithmetic control device that controls rotation of the sub rotor, and the main rotor is rotated by being drivingly connected to the engine, the sub rotor is rotated by a motor driven by electric power generated from a generator operated by the engine, and when orientation control to tilt the fuselage is performed, the arithmetic control device increases an output distribution ratio of the sub rotor to above an output distribution ratio of the sub rotor when hovering is performed. Thus, by increasing the output distribution ratio of the sub rotor when the orientation control to tilt the fuselage is performed in order to cause the engine-mounted autonomous flying device to move in the air, the fuselage can be tilted in a preferable manner and moved.

Also, in engine-mounted autonomous flying device according to the present invention, the engine-mounted autonomous flying device according to claim 1, wherein the arithmetic control device sets the output distribution ratio of the sub rotor at 10% or more and 30% or less when the orientation control is performed. Thus, by setting the output distribution ratio of the sub rotor at 10% or more when the orientation control is performed, the sub rotor is provided with sufficient rotational force, so that the fuselage is tilted in the air in a preferable manner and moved. Also, by setting the output distribution ratio of the sub rotor at 30% or less, the orientation of the fuselage in the air can be stabilized.

Also, the engine-mounted autonomous flying device according to the present invention further includes: an electric power converter that converts the electric power generated from the generator; and a capacitor that stores electric power outputted from the electric power converter, and the arithmetic control device charges the capacitor when the hovering is performed, and supplies electric power discharged by the capacitor to the motor when the orientation control is performed. Thus, by supplying electric power discharged by the capacitor to the motor when the orientation control is performed, it is possible to quickly increase the output of the sub rotor and cause the engine-mounted autonomous flying device to move at high speed in the air.

Also, in the engine-mounted autonomous flying device according to the present invention, a rotational speed of the engine when the hovering is performed and a rotational speed of the engine when the orientation control is performed are substantially same. Thus, when the orientation control is performed, the total energy required by the main rotor and the sub rotor is larger than that when hovering is performed, but in the present invention, the energy is replenished with electric energy discharged from the capacitor. This eliminates the need for increasing the rotational speed of the engine for performing the orientation control. Hence, the orientation control can be simple.

Also, in the engine-mounted autonomous flying device according to the present invention, the engine and the main rotor are drivingly connected via a belt. Thus, by connecting the engine and the main rotor drivingly via a belt, they can be drivingly connected easily even when the distance between the engine and the main rotor is long. Further, since a belt is lighter in weight than other mechanical power transmission means such as gears, employing a belt makes it possible to reduce the weight of the engine-mounted autonomous flying device.

Also, in the engine-mounted autonomous flying device according to the present invention, the engine has a first engine part having a first piston that reciprocates and a second engine part having a second piston that reciprocates while facing the first piston. Thus, since the pistons arranged opposite each other in the first engine part and the second engine part reciprocate, the vibrations and the like generated by the reciprocal motions cancel each other out. This can remarkably reduce the vibration generated by operation of the engine.

Also, in the engine-mounted autonomous flying device according to the present invention, the first piston and the second piston reciprocate inside a continuous cylinder. Thus, since the first piston and the second piston reciprocate inside the same cylinder, it is possible to suppress the vibration generated from the engine and also simplify the configuration of the engine.

Also, in the engine-mounted autonomous flying device according to the present invention, the first piston reciprocates inside a first cylinder, and the second piston reciprocates inside a second cylinder formed as a separate body from the first cylinder. Thus, since the first engine part and the second engine part individually have their cylinders, the first engine part and the second engine part can be prepared individually. This can reduce the manufacturing cost. Further, the intake path and the exhaust path in each of the first cylinder and the second cylinder can be formed in shapes suitable for gas intake and discharge.

Also, in the engine-mounted autonomous flying device according to the present invention, the sub rotor is attached to a tip side of a sub arm extending outward from a portion where the engine is arranged, and the main rotor is attached to a tip side of a main arm being longer than the sub arm and extending outward from the portion where the engine is arranged. Thus, by increasing the length of the main arm, to which the main rotor is attached, each rotor constituting the main rotor can be long. Accordingly, the payload can be increased further. Also, by decreasing the length of the sub arm, to which the sub rotor is attached, orientation control or the like via changing the rotational speed of the sub rotor can be performed in a precise manner.

Also, in the engine-mounted autonomous flying device according to the present invention, driving force is transmitted to the main rotor via an engine-side pulley attached to a shaft extending from a crankshaft in the engine to an outside, a rotor-side pulley attached to the main rotor, and a belt looped between the engine-side pulley and the rotor-side pulley. Thus, driving force generated from the engine can be transmitted to the main rotor with a relatively simple configuration.

Also, in the engine-mounted autonomous flying device according to the present invention, when a direction in which a first engine part and a second engine part constituting the engine are arrayed is a first direction, and a direction which is perpendicular to the first direction is a second direction, the main rotor has a first main rotor driven by the first engine part and arranged on an outside along the first direction, and a second main rotor driven by the second engine part and leveled at a position opposite the first main rotor, and the sub rotor has, on the first main rotor side, a first sub rotor arranged on the outside along the second direction, and the second sub rotor arranged along the second direction at a position opposite the first sub rotor, and, on the second main rotor side, a third sub rotor arranged on the outside along the second direction, and the fourth sub rotor arranged along the second direction at a position opposite the third sub rotor. Thus, by having the first main rotor and the second main rotor at opposite end portions along the first direction and also having the four sub rotors, it is possible to increase the payload with the first main rotor and the second main rotor and also to precisely control the orientation of the entire fuselage with the four sub rotors.

Also, in the engine-mounted autonomous flying device according to the present invention, the engine has a crankshaft with a first balance mass formed thereon, and a balancer shaft with a second balance mass formed thereon at a symmetric position relative to the first balance mass, and the main rotor is rotated by driving force from the crankshaft and the balancer shaft. Thus, it is possible to drive the rotors without having a plurality of engine parts by using mechanical power taken out from the crankshaft and the balancer shaft.

Figure 1A:
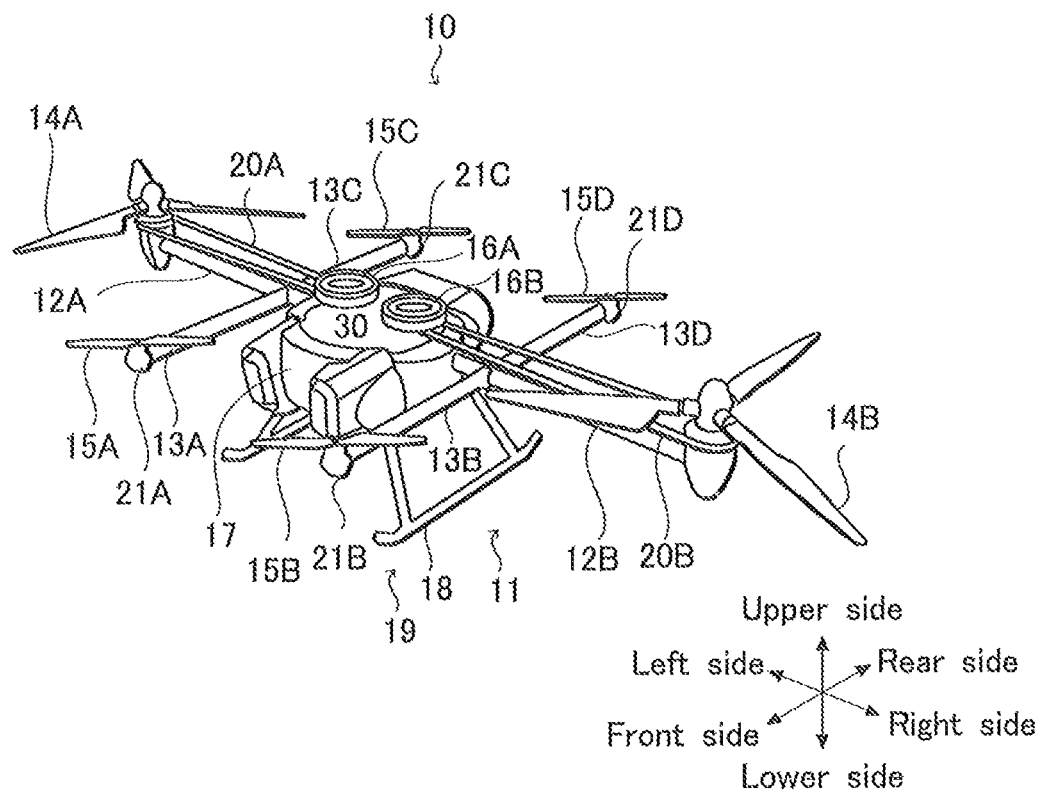
FIGS. 1A and 1B are a set of diagrams illustrating an autonomous flying device, according an embodiment of the present invention, FIG. 1A being a perspective view illustrating the autonomous flying device, and FIG. 1B being a top view thereof.

A configuration of an engine-mounted autonomous flying device according to an embodiment will be described below with reference to the drawings. In the following description, parts having the same configuration will be denoted by the same reference numeral, and description will not be repeated. Note that although up-down, front-rear, and left-right directions will be used in the following description, these directions are for convenience of description. Also, in the following description, the engine-mounted autonomous flying device will be referred to as an autonomous flying device 10. The engine-mounted autonomous flying device is also called a drone.

Figure 1B:
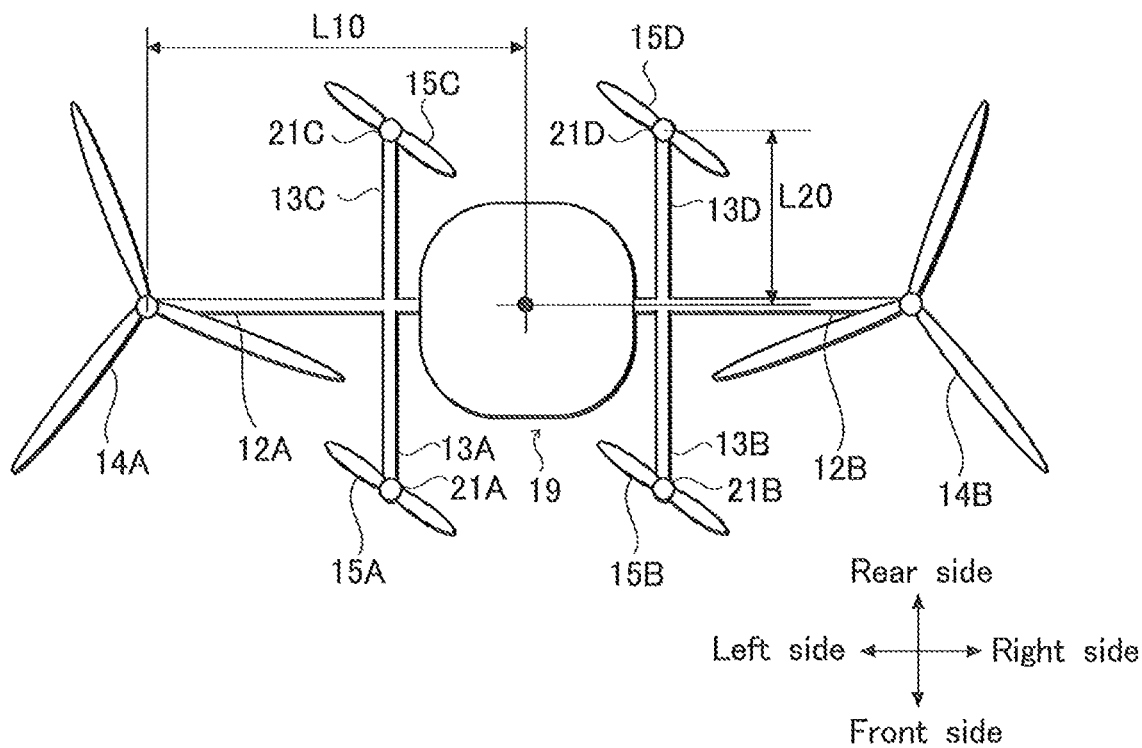

A schematic configuration of the autonomous flying device 10 according to the present embodiment will be described with reference to FIG. 1. FIG. 1A is a perspective view illustrating the entirety of the autonomous flying device 10, and FIG. 1B is a top view of the autonomous flying device 10.

Referring to FIG. 1A, the autonomous flying device 10 is a so-called hybrid autonomous flying device. Specifically, a main rotor 14A and the like are drivingly connected to an engine 30, while a sub rotor 15A and the like are supplied with electric energy from the engine 30 via a generator 16A and the like. In the following description, the main rotor 14A and the like will also be referred to simply as main rotors 14, and the sub rotor 15A and the like will also be referred to simply as sub rotors 15. Here, the left-right direction in the sheet of FIG. 1 is a first direction along which engine parts constituting the engine 30 are arrayed, and the front-rear direction in the sheet is a second direction.

The autonomous flying device 10 mainly has: a frame 11; the engine 30, which is disposed substantially at the center of the frame 11; the generator 16A and the like, which are driven by the engine 30; the sub rotors 15, which are rotated by electric power generated by the generator 16A and the like; and the main rotors 14, which are rotated by being drivingly connected to the engine 30.

The frame 11 is formed in such a frame shape as to support the engine 30, the generator 16A, various cables, and a control board (not illustrated here), and so on. A metal or resin formed into the frame shape is employed as the frame 11. On a lower end portion of the frame 11, skids 18 are formed which contact the ground when the autonomous flying device 10 lands on the ground. The frame 11 includes a main frame 12A and the like that support the main rotors 14, and a sub frame 13A and the like that support the sub rotors 15. The configurations of the main frame 12A and the like and the sub frame 13A and the like will be described later.

The engine 30, the various cables, the control board (not illustrated here), and so on are housed in a casing 17. The casing 17 is made of a synthetic resin plate material formed in a predetermined shape, for example, and is fixed to a center portion of the frame 11. Here, the casing 17 and the members incorporated therein will be referred to as a body part 19.

The generators 16A and 16B are disposed above the engine 30. The generators 16A and 16B generate electric power by being rotated by the engine 30. The electric power generated by the generators 16A and 16B is supplied to a motor 21 and the like that rotate the sub rotor 15A and the like. That electric power is also supplied to an arithmetic control device that controls the rotation of the sub rotor 15A and the like, and so on.

The main frames 12A and 12B extend straight in the left-right direction from the body part 19. The main frames 12A and 12B are made of a metal or synthetic resin formed in a rod shape. The main rotor 14A is rotatably disposed at the left end of the main frame 12A, which extends leftward. A pulley not illustrated is connected to the main rotor 14A, and a belt 20A is looped between the pulley on the main rotor 14A side and a pulley not illustrated on the engine 30 side. The main rotor 14B, on the other hand, is rotatably disposed at the right end of the main frame 12B, which extends rightward. A pulley not illustrated is connected to the main rotor 14B, and a belt 20B is looped between the pulley on the main rotor 14B side and a pulley not illustrated on the engine 30 side. With this configuration, the main rotors 14 are drivingly connected to the engine 30. Thus, the main rotors 14 are rotated directly by the mechanical power generated by the engine 30, and therefore the energy loss that occurs when energy is transmitted from the engine 30 to the main rotors 14 is smaller than that of a series type.

The main rotors 14 have a function of generating lift that causes the autonomous flying device 10 to float in the air. The sub rotors 15, on the other hand, mainly serve to control the orientation of the autonomous flying device 10. For example, the sub rotors 15 rotate as appropriate so as to maintain the position and orientation of the autonomous flying device 10 when the autonomous flying device 10 is hovering. The sub rotors 15 also rotate so as to tilt the autonomous flying device 10 when the autonomous flying device 10 moves. Meanwhile, the main rotor 14A and a main rotor 14B rotate in opposite directions.

The sub frame 13A and the like extend in the front-rear direction and, like the above main frame 12A and the like, are made of a metal or synthetic resin formed in a rod shape. The sub frame 13A and the like extend from intermediate portions of the main frame 12A and the like. The sub rotor 15A is disposed at the front end of the sub frame 13A, and the sub rotor 15A is rotated by the motor 21A, which is disposed under it. A sub rotor 15B is disposed at the front end of a sub frame 13B, and the sub rotor 15B is rotated by a motor 21B disposed under it. A sub rotor 15C is disposed at the rear end of a sub frame 13C, and the sub rotor 15C is rotated by a motor 21C disposed under it. A sub rotor 15D is disposed at the rear end of a sub frame 13D, and the sub rotor 15D is rotated by a motor 21D disposed under it. The motors 21A, 21B, 21C, and 21D are supplied with electric power generated by the generators 16A and 16B. Inside the sub frame 13A and the like are routed cables for supplying electric power to the motor 21A.

Referring to FIG. 1B, a length L10 of the main frame 12A (the length from the center of the body part 19 to the left end of the main frame 12A) is longer than each single blade on the main rotor 14A. This prevents the rotating main rotor 14A from contacting the body part 19. Further, the length L10 of the main frame 12A is set to be sufficiently long so that the main rotor 14A will not contact the sub rotors 15A and 15C. The length of the main frame 12B is equal to that of the main frame 12A.

A length L20 of the sub frame 13D is longer than the length of each single blade on the sub rotor 15D so that the sub rotor 15D will not contact the body part 19. Also, the length L20 of the sub frame 13D (the length from the center of the body part 19 to the rear end of the sub frame 13D) is such a length as to avoid contact with the main rotor 14B. Here, the lengths of the other sub rotors 15A, 15B, and 15C are equal to that of the sub rotor 15D. Also, the lengths of the other sub frame 13A and the like are equal to that of the sub frame 13D. Further, the length L10 of the main frame 12A is sufficiently longer than the length L20 of the sub frame 13D.

The above main rotors 14 and sub rotors 15 are arranged to be line-symmetric with respect to a left-right direction symmetry line passing the center of the body part 19 along the left-right direction. The above main rotors 14 and sub rotors 15 are also arranged to be line-symmetric with respect to a front-rear direction symmetry line passing the center of the body part 19 along the front-rear direction. This symmetric arrangement of the main rotors 14 and the sub rotors 15 can stable the position and orientation of the autonomous flying device 10 while the autonomous flying device 10 is in the air.

The main rotor 14 and the like and the sub rotor 15A and the like rotate simultaneously when the autonomous flying device 10 with the above configuration flies. Thrust generated by rotation of the main rotor 14 and the like makes the autonomous flying device 10 float, and the sub rotor 15A and the like rotate individually to control the position and orientation of the autonomous flying device 10 in the air. To move the autonomous flying device 10, orientation control to tilt the autonomous flying device 10 is executed by changing the rotational speeds of the sub rotor 15A and the like while rotating the main rotor 14 and the like at a predetermined speed. This orientation control will be described later.

A connection configuration in the autonomous flying device 10 will be described with reference to a block diagram in FIG. 2. The autonomous flying device 10 has an arithmetic control device 31 that controls its position and orientation in the air. The arithmetic control device 31 includes a CPU, a RAM, a ROM, and so on, and controls the rotation of the motor 21A and the like, which drive the sub rotor 15A and the like, based on instructions from various sensors, a camera, and an operating device that are not illustrated here. The operating device here is a so-called controller that is wirelessly connected or wired to the autonomous flying device 10 and enables a user to manipulate the position, altitude, moving direction, moving speed, and the like of the autonomous flying device 10.

As described above, the autonomous flying device 10 is capable of floating in the air and moving in a predetermined direction by rotating the main rotors 14 and the sub rotors 15 with driving energy generated by the engine 30, as described above. Also, the autonomous flying device 10 controls its position and orientation in the air by controlling the rotational speeds of the motor 21A and the like, which rotate the sub rotors 15.

The engine 30 is the energy source for the motor 21A and the like. The generator 16A and the like, an inverter 32 (electric power converter), a capacitor module 34, and a driver 24A and the like are interposed between the engine 30 and the motor 21A and the like. With this configuration, driving force generated from the engine 30 is converted into electric power, and the motor 21A and the like are rotated at predetermined rotational speeds with this electric power to thereby control the position and orientation of the autonomous flying device 10 and move the autonomous flying device 10.

As will be described later, the engine 30 is of a reciprocating type that uses gasoline or the like as the fuel, and drives the generators 16A and 16B with its driving force. Here, as described above, the engine 30 drives the main rotors 14 as well. The engine 30 is controlled by the arithmetic control device 31.

AC electric power generated from the generators 16A and 16B is supplied to the inverter 32. In the inverter 32, firstly a converter circuit converts the AC electric power into DC electric power, and then an inverter circuit converts the DC electric power into AC electric power of a predetermined frequency. During hovering, part of the electric power outputted from the inverter 32 is stored in the capacitor module 34. The electric power stored in the capacitor module 34 is supplied to the motor 21A and the like when the autonomous flying device 10 changes its position and/or orientation. The capacitor module 34 is capable of supplying a large current to the load in a short time as compared to a rechargeable battery or the like. This makes it possible to instantaneously increase the rotational speeds of the motor 21A and the like and thus quickly move the autonomous flying device 10.

Also, part of the electric power outputted from the inverter 32 is supplied to an excess electric power consumption circuit 33 as well. The excess electric power consumption circuit 33 is a circuit that consumes part of the electric power converted by the inverter 32 which is not to be used by the motor 21A or the like. Including the excess electric power consumption circuit 33 enables stable operation of the engine 30 and the inverter 32. The behavior of the inverter 32 is controlled by the arithmetic control device 31.

Using the electric power generated from the inverter 32, the drivers 24A, 24B, 24C, and 24D respectively control the amounts of current to be flowed into the motors 21A, 21B, 21C, and 21D, their rotation directions, their rotation timings, and so on. The behaviors of the drivers 24A, 24B, 24C, and 24D are controlled by the arithmetic control device 31.

The autonomous flying device 10 with the above configuration uses different electric power supply system for a hovering state in which the autonomous flying device 10 stays at one spot in the air and a moving state in which the autonomous flying device 10 moves toward a certain location.

Specifically, in the hovering state, electric power is supplied from the generators 16A and 16B to the inverter 32, the driver 24A and the like, the motor 21A and the like in this order. Then, the arithmetic control device 31 rotates the motor 21A at predetermined rotational speeds by controlling the driver 24A and the like based on the outputs from the various sensors such that the autonomous flying device 10 stays at one spot while maintaining a horizontal position relative to the ground. In this way, the sub rotor 15A and the like illustrated in FIG. 1 rotate at predetermined speeds. Hence, the autonomous flying device 10 hovers stably.

On the other hand, in the moving state where the autonomous flying device 10 is caused to move, the arithmetic control device 31 firstly supplies the electric power stored in the capacitor module 34 to the driver 24A and the like based on the user's instruction from the controller or the like. Thus, the driver 24 and the like are supplied with electric power from the capacitor module 34 in addition to the electric power supplied from the inverter 32. For example, referring to FIG. 1, to cause the autonomous flying device 10 to move forward, the arithmetic control device 31 controls the driver 24A and the like so as to supply the supplied electric power to the motors 21C and 21D, which drive the sub rotors 15C and 15D, and thereby make the rotational speeds of the sub rotors 15C and 15D higher than the rotational speeds of the sub rotors 15A and 15B.

As a result, the autonomous flying device 10 tilts to slightly turn counterclockwise in a view of the autonomous flying device 10 from the right. The main rotors 14A and 14B are rotated in this tilted state. Thus, a combined force of the lift generated by the main rotors 14A and 14B and the gravity exerted on the autonomous flying device 10 is exerted forward. Consequently, the autonomous flying device 10 moves forward.

After the autonomous flying device 10 moves to a predetermined spot, the arithmetic control device 31 stops the supply of electric power from the capacitor module 34 to the driver 24A and the like to thereby rotate the motor 21A and the like at a substantially equal speed via the driver 24A and the like. Thus, the autonomous flying device 10 hovers again.

As described above, the autonomous flying device 10 according to the present embodiment is a so-called hybrid type having the main rotor 14 and the like, which are rotated by driving force from the engine 30, and the sub rotor 15A and the like, which are rotated by the motor 21 and the like, which are driven by the engine 30. Thus, compared to the above-mentioned series type, the autonomous flying device 10 can improve the energy consumption by approximately 50%.

Next, configurations of the engine 30 mounted on the autonomous flying device 10 with the above configuration will be described with reference to FIGS. 3 to 5. The autonomous flying device 10 according to the present embodiment employs a vibration-free or low-vibration engine as the engine 30 since the position and orientation of the autonomous flying device 10 in the air cannot be precisely controlled if the engine 30 generates a large vibration.

Figure 3A:
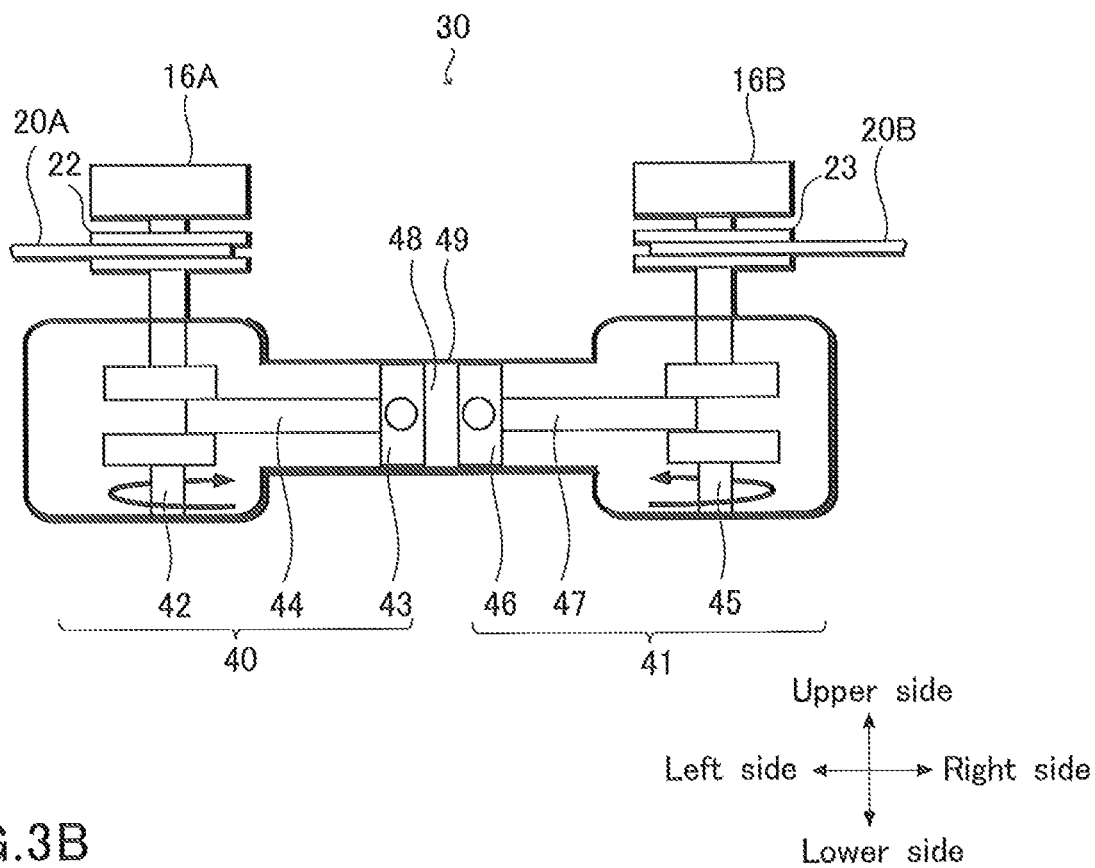
FIGS. 3A and 3B are a set of diagrams illustrating the autonomous flying device according to the embodiment of the present invention, FIG. 3A being a side cross-sectional view illustrating a mounted engine, and FIG. 3B being a top cross-sectional view thereof.

One form of the engine 30 will be described with reference to FIG. 3. FIG. 3A is a cross-sectional view of the engine 30 as viewed from the front, and FIG. 3B a cross-sectional view of the engine 30 as viewed from above. The engine 30 illustrated here has two engine parts (first engine part 40 and second engine part 41) arranged opposite each other in the left-right direction.

Figure 3B:
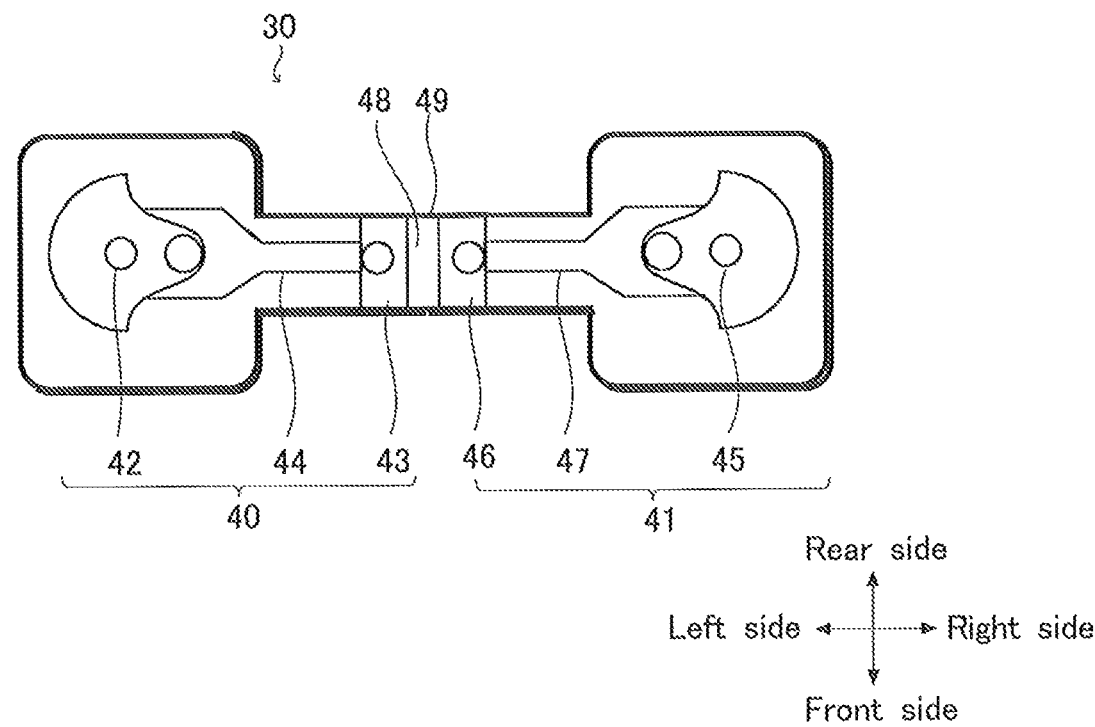
Figure 4A:
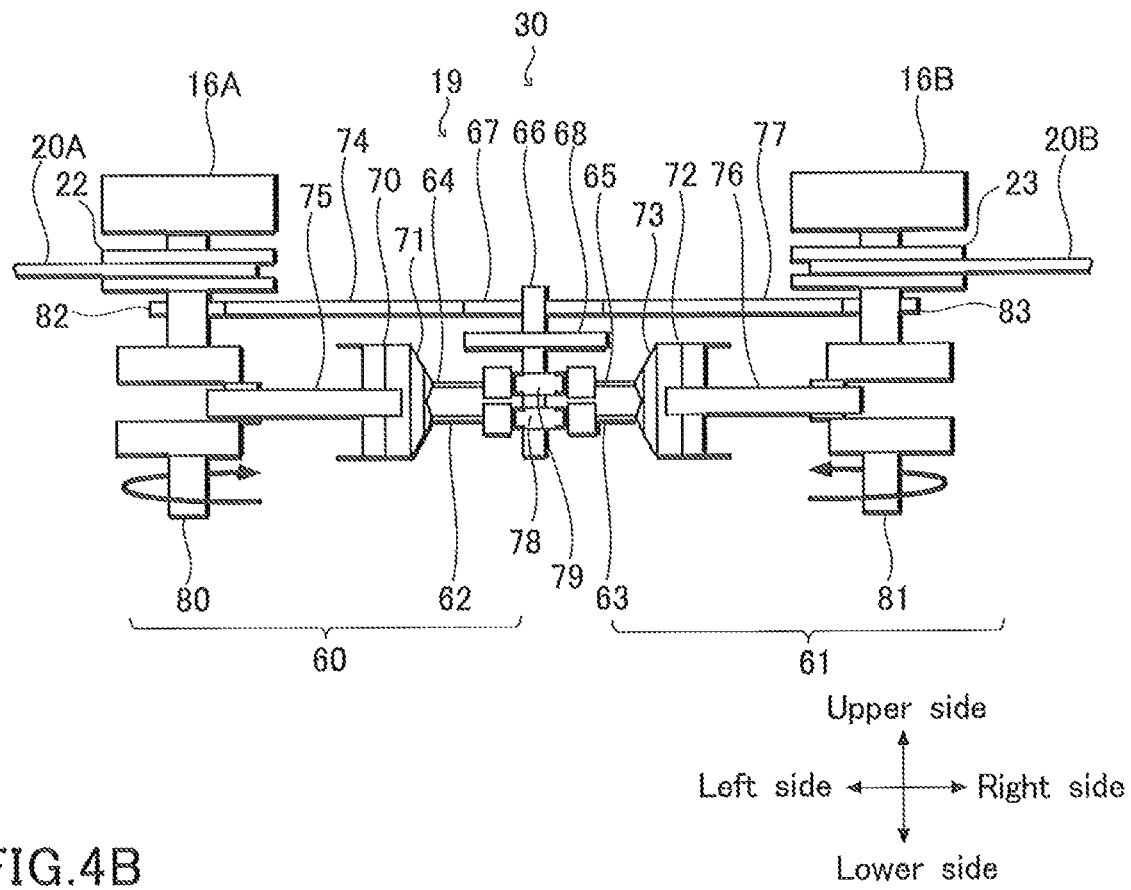
FIGS. 4A and 4B are a set of diagrams illustrating the autonomous flying device according to the embodiment of the present invention, FIG. 4A being a side cross-sectional view illustrating another mounted engine, and FIG. 4B being a top cross-sectional view thereof.

Referring to FIGS. 3A and 3B, the engine 30 has the first engine part 40 and the second engine part 41, which are arranged on the left side and the right side in the sheet of the figures, respectively.

The first engine part 40 has: a first piston 43 that reciprocates in the left-right direction; a first crankshaft 42 that converts the reciprocal motion of the first piston 43 into rotational motion; and a first connecting rod 44 that rotatably couples the first piston 43 and the first crankshaft 42.

The second engine part 41 has: a second piston 46 that reciprocates in the left-right direction; a second crankshaft 45 that converts the reciprocal motion of the second piston 46 into rotational motion; and a second connecting rod 47 that rotatably couples the second piston 46 and the second crankshaft 45.

A pulley 22 and the generator 16A are connected to the upper end side of the first crankshaft 42. Also, a pulley 23 and the generator 16B are connected to the upper end side of the second crankshaft 45.

The first piston 43 of the first engine part 40 and the second piston 46 of the second engine part 41 share a combustion chamber 48. In other words, the first piston 43 and the second piston 46 reciprocate inside a single continuous cylinder. In this way, the first engine part 40 and the first piston 43 move back and forth simultaneously toward the center, and thus the ratio of expansion of a mixed gas in the combustion chamber 48 can be high while the amount of stroke is reduced.

Also, in the engine 30, a volumetric space not illustrated here is formed which communicates with the combustion chamber 48, and a spark plug is arranged in this volumetric space. Also, an intake port and an exhaust port not illustrated here are formed in the combustion chamber 48. A mixed gas containing a fuel such as gasoline is introduced through the intake port into the combustion chamber 48, and the exhaust gas after combustion is discharged from the combustion chamber to the outside through the exhaust port.

Referring to FIG. 3A, the engine 30 with the above configuration operates as below. First is an intake stroke in which the first piston 43 and the second piston 46 move outward inside a cylinder 49 from its center, thereby introducing a mixed gas being a mixture of the fuel and air into the cylinder 49. Next is a compression stroke in which the first piston 43 and the second piston 46 are pushed toward the center by the inertia of the rotating first crankshaft 42 and second crankshaft 45, thereby compressing the mixed gas inside the cylinder 49. Next is a combustion stroke in which the spark plug not illustrated sparks inside the combustion chamber 48, thereby combusting the mixed gas inside the cylinder 49 and thus pushing the first piston 43 and the second piston 46 to the outer ends, which are the respective bottom dead centers. After this is an exhaust stroke in which the first piston 43 and the second piston 46 are pushed inward by the inertia of the rotating first crankshaft 42 and second crankshaft 45, thereby discharging the gas after the combustion present in the cylinder 49 to the outside.

In the present form of the engine 30, the two first and second pistons 43 and 46, which reciprocate inside the single cylinder 49, split each stroke. Thus, the ratio of compression of the mixed gas can be higher than that of a normal gasoline engine. Also, since the first piston 43 and the second piston 46 face each other in the cylinder 49, a cylinder head, which is required for a typical engine, is not required. Thus, the configuration of the engine 30 is simple and light in weight. Also, the members constituting the engine 30, i.e. the first piston 43 and the second piston 46, the first crankshaft 42 and the second crankshaft 45, and so on are arranged opposite each other and operate opposite each other. Thus, the vibrations generated by the sets of members of the engine 30 cancel each other out. This can reduce the vibration generated on the outer side from the entire engine 30. Hence, with the present form, it is possible to reduce the size, weight, and vibration of the autonomous flying device 10 by mounting the engine 30 with the above structure. In particular, with the vibration reduced, it is possible to prevent adverse effects on precision equipment such as the arithmetic control device for the orientation control, the motor output control, and so on, and a GPS sensor. It is also possible to prevent the autonomous flying device 10 from damaging a delivery package the autonomous flying device 10 is transporting with its vibration.

Another form of the engine 30 will be described with reference to FIG. 4. FIG. 4A is a side view of the engine 30 as viewed from the front, and FIG. 4B is a top view of the engine 30.

Figure 4B:
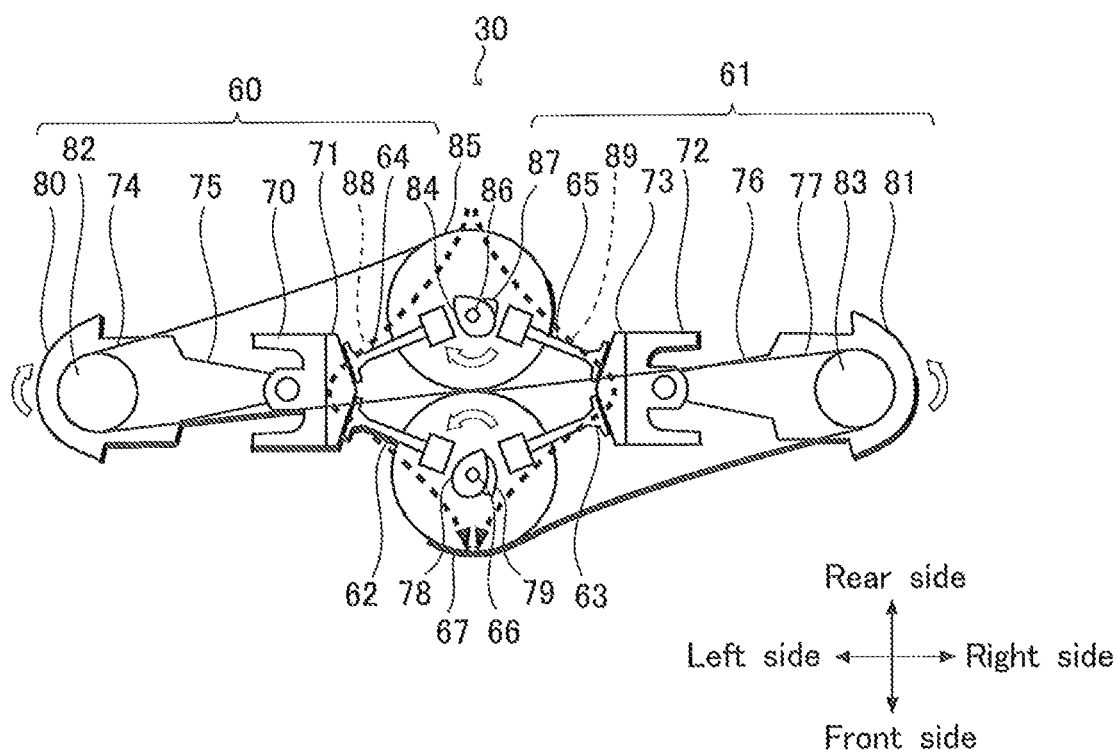
Figure 5:
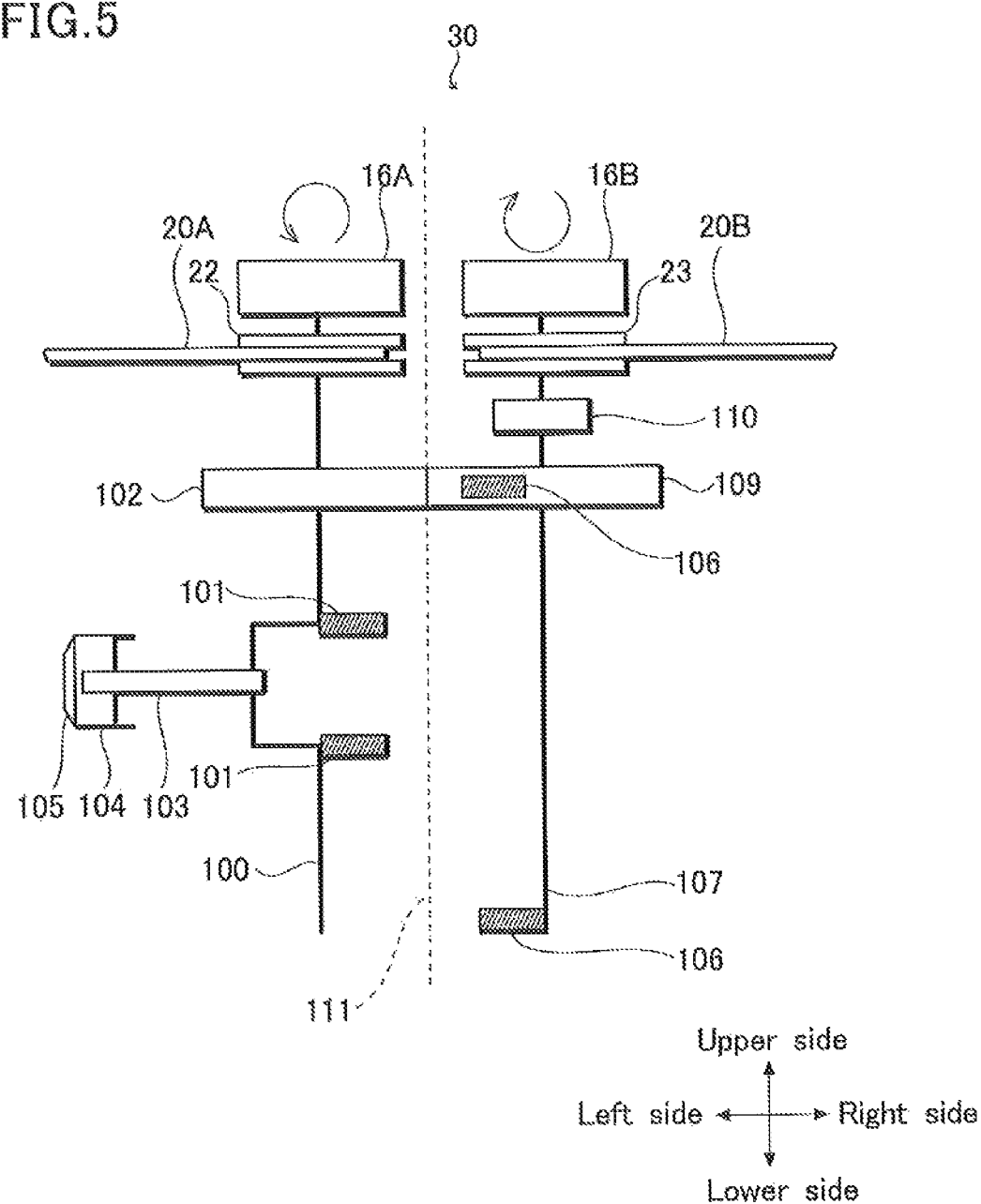
FIG. 5 is a diagram illustrating the autonomous flying device according to the embodiment of the present invention, and is a side cross-sectional view illustrating still another mounted engine.

Referring to FIGS. 4A and 4B, the engine 30 in the present case includes a first engine part 60 on the left and a second engine part 61 on the right, and an individual cylinder is formed in each of the engine parts. This feature differs from the engine 30 illustrated in FIG. 3.

The first engine part 60 has: a first cylinder 71; a first piston 70 that reciprocates inside the first cylinder 71; a first crankshaft 80 that converts the reciprocal motion of the first piston 70 into rotational motion; a first connecting rod 75 that rotatably couples the first piston 70 and the first crankshaft 80; a first intake valve 64; and a first exhaust valve 62.

The second engine part 61 has: a second cylinder 73; a second piston 72 that reciprocates inside the second cylinder 73; a second crankshaft 81 that converts the reciprocal motion of the second piston 72 into rotational motion; a second connecting rod 76 that rotatably couples the second piston 72 and the second crankshaft 81; a second intake valve 65; and a second exhaust valve 63.

Here, the above first engine part 60 and second engine part 61 may be housed in an engine block formed as a single body by casting, or the first engine part 60 and the second engine part 61 may be housed in separate engine blocks.

In the engine 30, the main constituent components constituting the first engine part 60 and the second engine part 61 are arranged along the left-right direction. Specifically, the first cylinder 71, the first piston 70, the first crankshaft 80, and the first connecting rod 75 of the first engine part 60 are arranged along the left-right direction. Further, the second cylinder 73, the second piston 72, the second crankshaft 81, and the second connecting rod 76 of the second engine part 61 are also arranged along the left-right direction. By arranging the constituent components of each engine part along the left-right direction as described above, the vibrations generated by operation of the engine parts cancel each other out. This can improve the vibration suppression effect.

Further, the first engine part 60 and the second engine part 61 are arranged symmetrically in the left-right direction. With this configuration too, the vibrations generated by operation of the engine parts cancel each other out. This can improve the vibration suppression effect.

Referring to FIGS. 4A and 4B, the first engine part 60 has a valve drive mechanism that controls the operation of the above-mentioned first intake valve 64 and second intake valve 65.

This valve drive mechanism has a crank pulley 82, a cam pulley 85, and a timing belt 74 looped between the crank pulley 82 and the cam pulley 85. The crank pulley 82 is connected to a portion of the first crankshaft 80 extending to the outside. The cam pulley 85 is connected to a cam shaft 86 along with a first intake cam 84 that contacts the first intake valve 64 to control its forward-backward motion and a second intake cam 87 that contacts the second intake valve 65 to control its forward-backward motion. The first intake cam 84 and the second intake cam 87 are connected to the cam shaft 86 with such a phase difference as to synchronize the timing with which the first intake cam 84 presses the first intake valve 64 and the timing with which the second intake cam 87 presses the second intake valve 65 with each other.

Referring to FIG. 4A, the pulley 22 and the generator 16A are connected to the upper end side of the first crankshaft 80 of the first engine part 60, and the pulley 23 and the generator 16B are connected to the upper end side of the second crankshaft 81 of the second engine part 61.

There is a mechanism that drives the first exhaust valve 62 and the second exhaust valve 63, the mechanism having a crank pulley 83, a cam pulley 67, and a timing belt 77 looped between the crank pulley 82 and the cam pulley 85. The crank pulley 83 is connected to a portion of the second crankshaft 81 extending to the outside. The cam pulley 67 is connected to a cam shaft 66 along with a first exhaust cam 78 that contacts the first exhaust valve 62 to control its forward-backward motion and a second exhaust cam 79 that contacts the second exhaust valve 63 to control its forward-backward motion.

The first exhaust cam 78 and the second exhaust cam 79 are connected to the cam shaft 66 with such a phase difference as to synchronize the timing with which the first exhaust cam 78 presses the first exhaust valve 62 and the timing with which the second exhaust cam 79 presses the second exhaust valve 63 with each other.

As illustrated in FIG. 4A, a reversing gear 68 is connected to the cam shaft 66, to which the first exhaust cam 78 and the like are attached. Also, a reversing gear not illustrated here is connected to the cam shaft 86 (FIG. 4B) as well. Further, the reversing gear 68 on the cam shaft 66 and the reversing gear on the cam shaft 86 are meshed with each other. With this configuration, a crankshaft reversal-synchronization mechanism is formed which causes the first crankshaft 80 and the second crankshaft 81 to rotate in opposite directions.

The operation of the engine 30 illustrated in FIG. 4 is basically similar to that illustrated in FIG. 3. Specifically, the first piston 70 and the second piston 72 perform a compression stroke and the like by simultaneously moving inward in the left-right direction, and executes a combustion stroke and the like by simultaneously moving outward in the left-right direction. Also, with the above configuration, a flow path 88 and a flow path 89 being intake-exhaust paths are simple, thereby enabling efficient gas intake and discharge.

Another form of the engine 30 employed in the autonomous flying device 10 according to the present embodiment will be described with reference to FIG. 5. The engine 30 to be discussed here has a single piston 104, and takes out driving force from a crankshaft 100 and a balancer shaft 107.

Specifically, the engine 30 has: a cylinder 105; the piston 104, which reciprocates inside the cylinder 105; the crankshaft 100, which converts the reciprocal motion of the piston 104 into rotational motion; a connecting rod 103 which rotatably couples the piston 104 and the crankshaft 100. A crank gear 102, the pulley 22, and the generator 16A are attached to the upper end side of the crankshaft 100. Balance masses 101 are also attached to the crankshaft 100. Attaching the balance masses 101 can reduce primary inertia force generated by rotation of the crankshaft 100.

The balancer shaft 107 is disposed to the right of the crankshaft 100. The balancer shaft 107 is a so-called eccentric shaft. The balancer shaft 107 is capable of reducing the vibration generated by rotation of the crankshaft 100 by rotating along with the crankshaft 100. A balancer gear 109, a flywheel 110, the pulley 23, and the generator 16B are attached to the upper end side of the balancer shaft 107.

Balance masses 106 are attached to the balancer shaft 107. The balance masses 101 formed on the crankshaft 100 and the balance masses 106 formed on the balancer shaft 107 have a symmetrical positional relationship. Specifically, the positional relationship between the balance masses 101 and the balance masses 106 is such that they are line-symmetric with respect to a symmetry line 111 extending vertically at the midpoint between the rotational center of the crankshaft 100 and the rotational center of the balancer shaft 107.

The balance masses 106 may be formed only on the balancer shaft 107, but the balance masses 106 are formed on the balancer shaft 107 and the balancer gear 109 in the present case. Also, the moment of inertia about the balancer shaft 107 including the balance masses 106 and the moment of inertia about the crankshaft 100 including the balance masses 101 are equal or substantially equal. This can further reduce the vibration generated by operation of the engine 30.

Here, the flywheel 110 can be formed on the balancer shaft 107. In this case, the moment of inertia about the balancer shaft 107 including the flywheel 110 and the moment of inertia about the crankshaft 100 is set to be equal. This can further increase the vibration suppression effect.

Figure 6A:
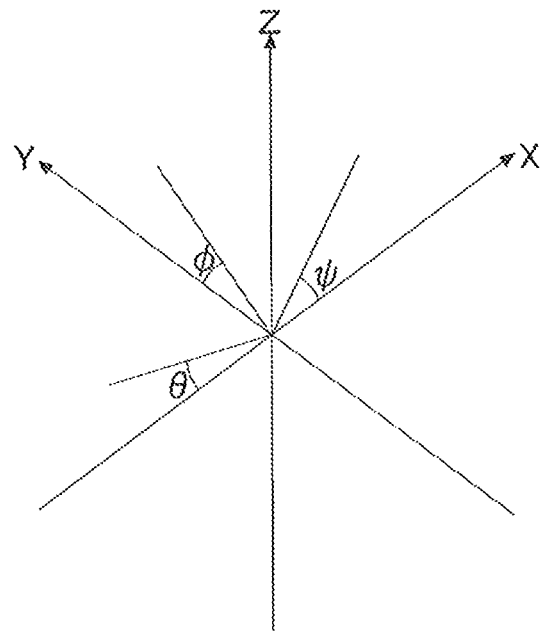
FIGS. 6A and 6B are a set of diagrams illustrating the autonomous flying device according to the embodiment of the present invention, FIG. 6A illustrating a space-fixed coordinate system, and FIG. 6B illustrating a fuselage-fixed coordinate system.
Figure 6B:
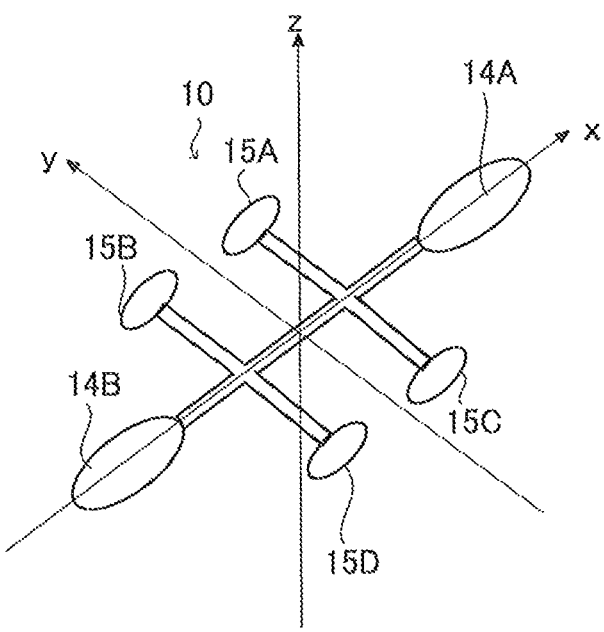
Figure 7A:
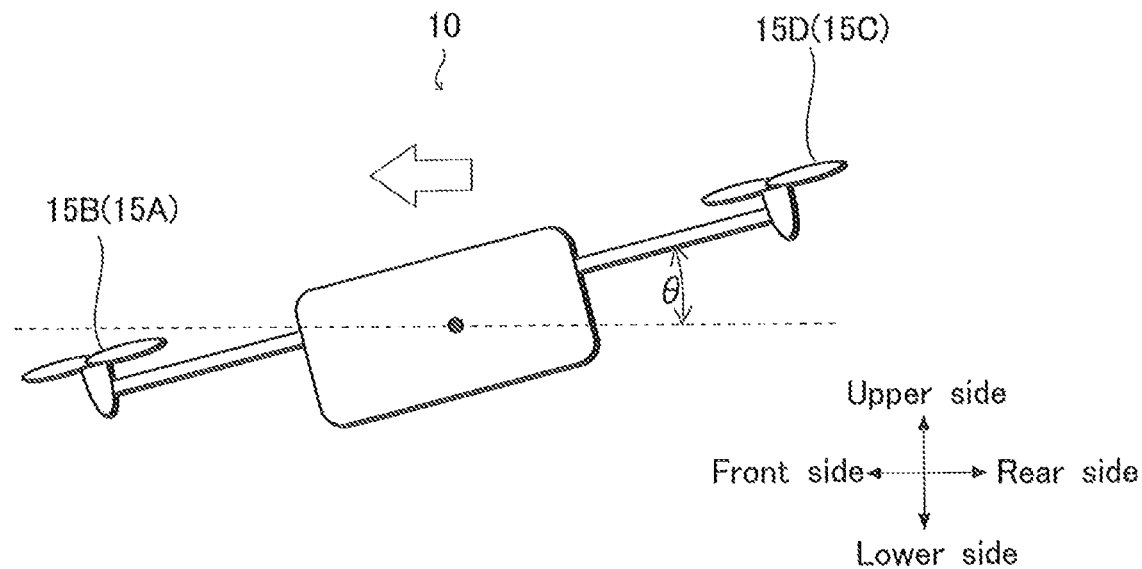
FIGS. 7A and 7B are a set of diagrams illustrating the autonomous flying device according to the embodiment of the present invention, FIG. 7A being a side view illustrating the fuselage tilted at 10 degrees, and FIG. 7B being a graph illustrating time-series changes in power.
Figure 7B:
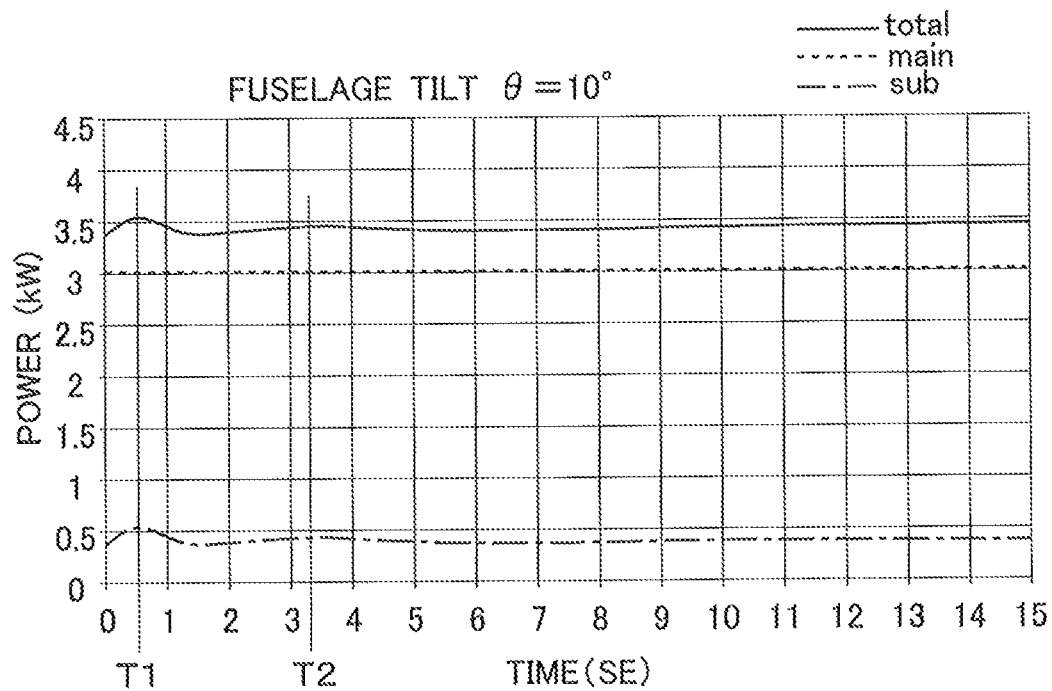
Figure 8A:
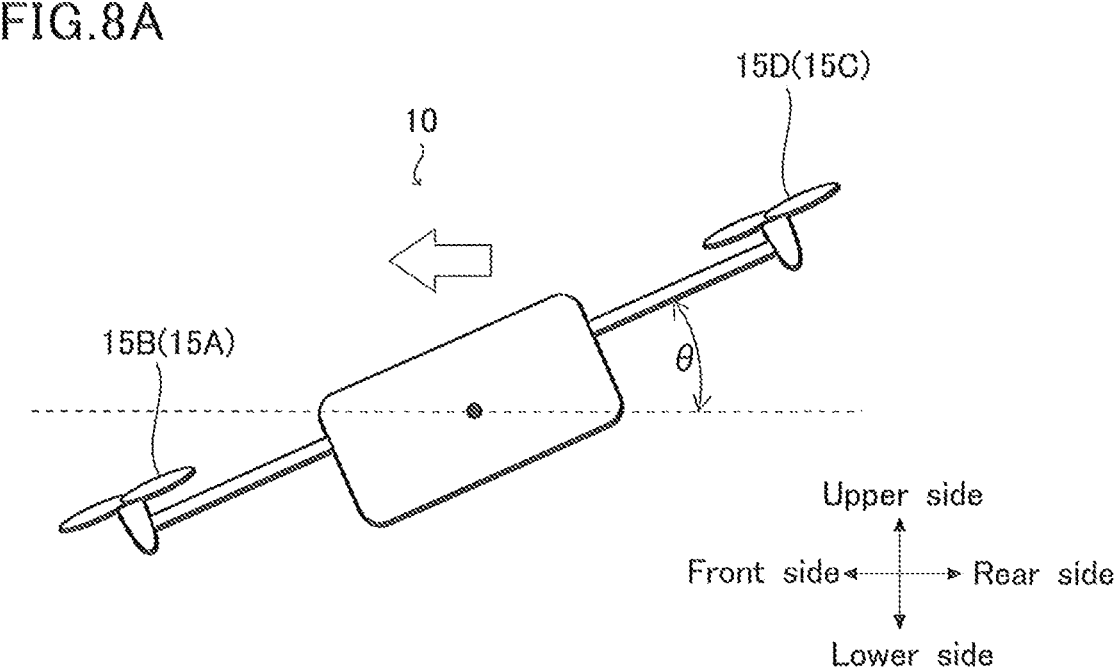
FIGS. 8A and 8B are a set of diagrams illustrating the autonomous flying device according to the embodiment of the present invention, FIG. 8A being a side view illustrating the fuselage tilted at 35 degrees, and FIG. 8B being a graph illustrating time-series changes in power.
Figure 8B:
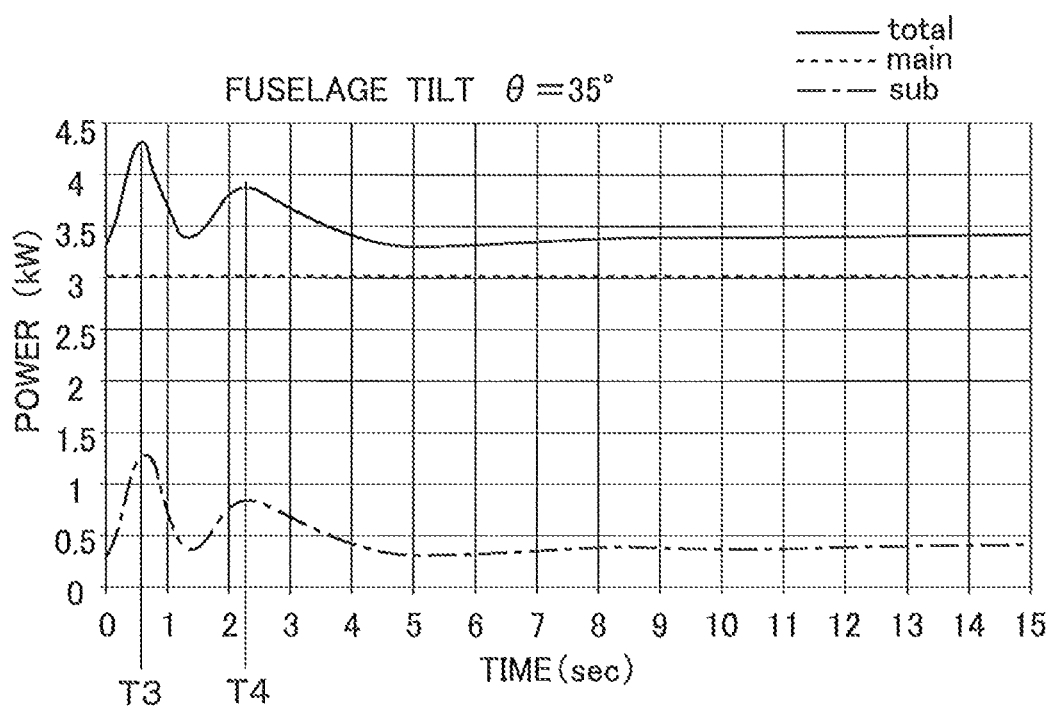

Output distribution ratios for tilting the autonomous flying device 10 for movement will be described with reference to FIGS. 6 to 8. FIG. 6 is a set of diagrams for explaining a coordinate system used for simulation. FIG. 7A is a side view illustrating the autonomous flying device 10 tilted at 10 degrees, and FIG. 7B is a graph illustrating time-series changes in output power in this case. FIG. 8A is a side view illustrating the autonomous flying device 10 tilted at 35 degrees, and FIG. 8B is a graph illustrating time-series changes in output power in this case.

First, equations of motion used to simulate the output of the autonomous flying device 10 will be described with reference to FIG. 6. FIG. 6A is a graph illustrating a space-fixed coordinate system, and FIG. 6B is a graph illustrating a fuselage-fixed coordinate system.

When a space-fixed coordinate system is defined as FIG. 6A and a fuselage-fixed coordinate system is defined as FIG. 6B, the relationship between these two fixed coordinate systems can be described as mathematical equation 1 below. Here, $\phi$, $\theta$, and $\Psi$ are Euler angles representing roll, pitch, and spin, respectively.

[Math. 1]

$$\begin{Bmatrix} x \\ y \\ z \end{Bmatrix} = R \cdot \begin{Bmatrix} X \\ Y \\ Z \end{Bmatrix}, R =$$

$$\begin{bmatrix} \cos\psi\cos\theta & \sin\psi\cos\theta & -\sin\theta \\ \cos\psi\sin\theta\sin\phi - \sin\psi\cos\phi & \sin\psi\sin\theta\sin\phi - \cos\psi\cos\phi & \cos\theta\sin\phi \\ \cos\psi\sin\theta\cos\phi - \sin\psi\sin\phi & \sin\psi\sin\theta\cos\phi - \cos\psi\sin\phi & \cos\theta\cos\phi \end{bmatrix}$$

Also, translational motion of a center of gravity $\{X_G, Y_G, Z_G\}^T$ of the autonomous flying device 10 is described as mathematical equation 2 below in the space-fixed coordinate system. Here, m denotes the weight of the fuselage of the autonomous flying device 10, g denotes the gravitational acceleration, and T denotes the thrust generated by the main rotor 14A and the like and the sub rotor 15A and the like.

[Math. 2]

$$m\begin{Bmatrix} \ddot{X}_G \\ \ddot{Y}_G \\ \ddot{Z}_G \end{Bmatrix} = m\begin{Bmatrix} 0 \\ 0 \\ -g \end{Bmatrix} + T = \begin{Bmatrix} \cos\psi\sin\theta\cos\phi + \sin\psi\sin\phi \\ \cos\psi\sin\theta\cos\phi + \cos\psi\sin\phi \\ \cos\theta\cos\phi \end{Bmatrix}$$

Further, rotational motion of the autonomous flying device 10 about its center of gravity is described as mathematical equation 3 below in the fuselage-fixed coordinate system. Here, $I_{XX}$, $I_{YY}$, and $I_{ZZ}$ denote the moments of inertia of the fuselage about the axes, $\{W_1, W_2, W_3\}^T$ denotes the angular velocity vectors, and $\{\tau_\phi, \tau_\theta, \tau_\psi\}^T$ denotes the torques about the axes generated by the orientation control rotors.

[Math. 3]

$$\begin{Bmatrix} I_{xx}\dot{W}_1 \\ I_{yy}\dot{W}_2 \\ I_{zz}\dot{W}_3 \end{Bmatrix} - \begin{Bmatrix} (I_{yy} - I_{zz})W_2W_3 \\ (I_{zz} - I_{xx})W_3W_1 \\ (I_{xx} - I_{yy})W_1W_2 \end{Bmatrix} = \begin{Bmatrix} \tau_\phi \\ \tau_\theta \\ \tau_\psi \end{Bmatrix}$$

Motion of the autonomous flying device 10 was simulated based on the above equations, and the following result was obtained.

In this simulation, observed was the difference in power distribution ratio between during hovering and during orientation control. Here, during orientation control refers to when the autonomous flying device 10 was tilted at, e.g., 10 degrees in order to cause the autonomous flying device 10 to move in the air. Also, the power distribution ratio refers to the ratio of the power generated by rotation of the main rotor 14A and the like and the power generated by rotation of the sub rotor 15A and the like.

While the autonomous flying device 10 is hovering, the main rotor 14A and the like generate a thrust that causes the device body to float whereas the sub rotor 15A and the like rotate to make the device body stay at a certain spot and maintain a parallel state. Thus, the output of the main rotor 14 and the like is far larger than the output of the sub rotor 15A and the like. For example, the power outputted by the main rotor 14 and the like is 3.04 W whereas the power outputted by the sub rotor 15A and the like is 0.34 W. In an example, the output distribution ratio of the main rotor 14 and the like and the sub rotor 15A and the like is 90%:10%.

Since the main rotor 14 and the like and the output shafts of the engine 30 are drivingly connected, the energy loss over the energy transmission path from the engine 30 to the main rotor 14 and the like is remarkably small. In other words, the energy efficiency over the energy transmission path from the engine 30 to the main rotor 14 and the like is remarkably high. On the other hand, since the sub rotor 15A and the like are supplied with energy from the engine 30 via the generator 16A and the like, the inverter 32, the motor 21A and the like, as illustrated in FIG. 2 and other figures, the energy efficiency over these paths is, for example, 70%, which is low. Thus, during hovering, the output distribution ratio of the main rotor 14 and the like is set large. In this way, the energy generated by the engine 30 can be efficiently used to float the autonomous flying device 10.

During orientation control, on the other hand, the sub rotor 15A and the like are rotated at high speed in order to tilt the autonomous flying device 10. Accordingly, the ratio of energy supplied to the sub rotor 15A and the like is larger than that during hovering. Also, the larger the angle of tilt of the autonomous flying device 10, the faster the sub rotor 15A and the like need to be rotated, and thus the larger the ratio of energy to be supplied to the sub rotor 15A and the like.

A case where the autonomous flying device 10 is tilted at 10 degrees in orientation control will be described with reference to FIG. 7. FIG. 7A is a side view illustrating a state where the autonomous flying device 10 is tilted at 10 degrees, and FIG. 7B is a graph illustrating time-series changes in the powers generated by the rotors. Here, the powers refer to the thrusts which the rotors generate by rotating.

Referring to FIG. 7A, in orientation control, the arithmetic control device 31 rotates the sub rotors 15C and 15D at a higher speed than the sub rotors 15A and 15B, so that the lift exerted on the rear of the autonomous flying device 10 is larger than the lift exerted on the front thereof. As a result, the autonomous flying device 10 is tilted counterclockwise. Here, the sub rotor 15A and the like are rotated such that the tilt angle $\theta$ of the autonomous flying device 10 can be 10 degrees.

In the graph illustrating in FIG. 7B, the horizontal axis represents time while the vertical axis represents the powers generated by the rotors. Here, the long-dashed short-dashed line indicates the power of the sub rotor 15A and the like, the dotted line indicates the power of the main rotor 14 and the like, and the solid line represents the total of the power of the sub rotor 15A and the like and the power of the main rotor 14 and the like.

Referring to this diagram, at a time T1, the sub rotors 15C and 15D are rotated at higher speed than the sub rotors 15A and 15B, so that the power of the sub rotor 15A and the like indicates the largest value (approximately 0.5 kW). As a result, the tilt angle of the autonomous flying device 10 becomes 10 degrees, as described above. In this state, the rotational speed of the sub rotors 15C and 15D is set to be equivalent to that of the sub rotors 15A and 15B, so that the autonomous flying device 10 moves forward with the thrust from the main rotor 14 and the like. Meanwhile, in the present embodiment, the rotational speed of the sub rotors 15C and 15D can be instantaneously increased with electric power supplied from the capacitor module 34 illustrated in FIG. 2.

Then, at a time T2, the autonomous flying device 10 reaches a predetermined speed and thus the rotational speed of the sub rotors 15A and 15B is increased to above that of the sub rotors 15C and 15D so that the autonomous flying device 10 can be in a parallel state. At this time too, the power of the sub rotor 15A and the like becomes relatively high but is lower than the power in the time T1.

From the time T1 to the time T2 the autonomous flying device 10 is tilted to accelerate, and at the time T2 the autonomous flying device 10 is put into the parallel state, thereby reducing to the acceleration to zero. After the time T2 the autonomous flying device 10 moves at a constant speed.

During the orientation control of the autonomous flying device 10, the output of the main rotor 14 and the like remains basically unchanged and is approximately 3 kw. Meanwhile, during this state, the rotational speed of the engine 30 may be constant or set at a high speed if necessary.

When the autonomous flying device 10 is tilted at 10 degrees as described above, the largest power of the sub rotor 15A and the like is approximately 0.6 kw, and the power of the main rotor 14 and the like is approximately 3.0 kw. Thus, the output distribution ratio of the main rotor 14 and the like and the sub rotor 15A and the like is 86%:14%.

A case where the autonomous flying device 10 is tilted at 35 degrees will be described with reference to FIG. 8. FIG. 8A is a side view illustrating the autonomous flying device 10 tilted at 35 degrees, and FIG. 8B is a graph illustrating time-series changes in power. Here, the control method of tilting the autonomous flying device 10 to move it is similar to that illustrated in FIG. 7. By setting the tilt angle θ of the autonomous flying device 10 at such a large angle, the autonomous flying device 10 can be caused to move at higher speed.

Referring to FIG. 8B, tilting the autonomous flying device 10 at 35 degrees requires the sub rotors 15C and 15D to rotate at a further higher speed. Thus, the largest value of the sub rotor 15A and the like at a time T3 is approximately 1.3 kw. Also, at a time T4, the power of the sub rotor 15A and the like becomes large again in order to put the autonomous flying device 10 into a parallel state. Here, from the time T3 to the time T4 the autonomous flying device 10 is tilted to accelerate, and at the time T4 the autonomous flying device 10 is put into the parallel state, thereby reducing to the acceleration to zero. After the time T4 the autonomous flying device 10 moves at a constant speed. In this case, since the autonomous flying device 10 is steeply tilted, the acceleration exerted on the autonomous flying device 10 is large. Accordingly, the autonomous flying device 10 can be moved at high speed.

As described above, during the orientation control of the autonomous flying device 10, the output of the main rotor 14 and the like remains basically unchanged and is approximately 3 kw. Meanwhile, during this state, the rotational speed of the engine 30 may be constant.

Thus, when the autonomous flying device 10 is tilted at 35 degrees to move, the output distribution ratio of the main rotor 14 and the like and the sub rotor 15A and the like is 70%:30%, for example. That is, the output of the sub rotor 15A and the like is larger than that when the autonomous flying device 10 is tilted at 10 degrees.

In the present embodiment, when the orientation of the autonomous flying device 10 is changed, the output distribution ratio of the sub rotor 15A and the like is increased to above that during hovering. Thus, the sub rotor 15A and the like are rotated at high speed with the autonomous flying device 10 caused to float using thrust from the main rotor 14 and the like. This enables the autonomous flying device 10 to instantaneously tilt and move.

Meanwhile, in the changing of the orientation of the autonomous flying device 10, the output distribution ratio of the sub rotor 15A and the like when the output of the sub rotor 15A and the like is largest is preferably 10% or more and 30% or less. By setting this output distribution ratio at 10% or more, the sub rotors are provided with sufficient rotational force, so that the autonomous flying device 10 can be tilted in the air in a preferable manner and moved. Also, by setting the distribution ratio at 30% or less, the orientation of the autonomous flying device 10 in the air can be stabilized.

Generally, changing the orientation of a multi-rotor autonomous flying device requires an output response on the order of 100 msec. Since the output response speed of engine-driven autonomous flying devices is not sufficiently high, it is not easy to accurately control their orientations. On the other hand, the autonomous flying device 10 according to the present embodiment electronically controls the rotational speed of the motor 21A and the like, which rotate the sub rotor 15A and the like, to control the orientation of the autonomous flying device 10. This enables an output response on the order of 100 msec. Thus, the orientation of the autonomous flying device 10 can be controlled accurately.

While an embodiment of the present invention has been described above, the present invention is not limited to the above embodiment.

Figure 2:
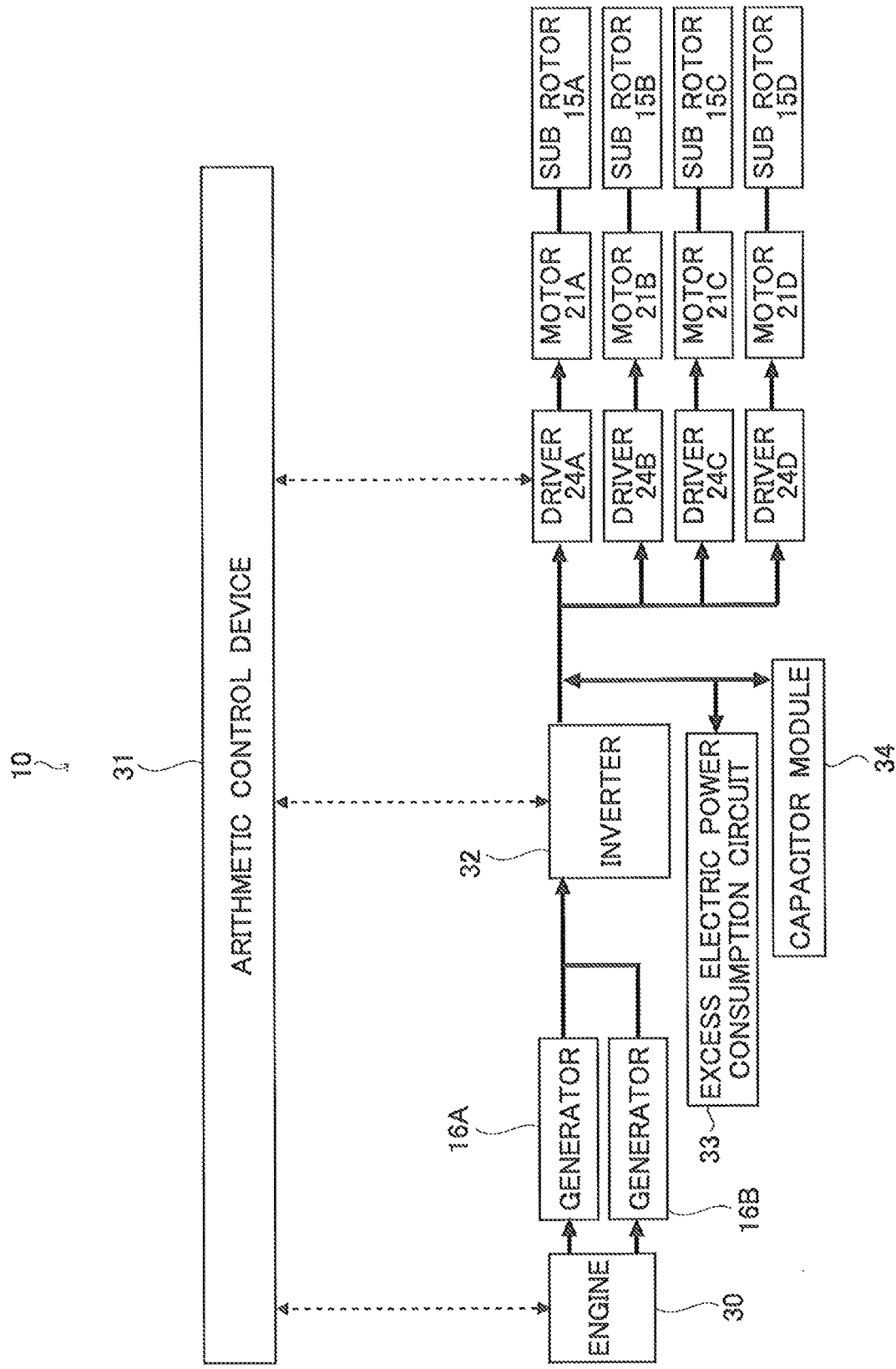
FIG. 2 is a diagram illustrating the autonomous flying device according to the embodiment of the present invention, and is a block diagram illustrating a connection configuration of components.

Referring to FIG. 2, the autonomous flying device 10 may be equipped with a rechargeable battery. Specifically, part of the electric power generated by the generator 16A and the like may be stored in a rechargeable battery, and electric power discharged from the rechargeable battery may be used as appropriate to rotate the motor 21A and the like.

Referring to FIG. 1, the driving force from the engine 30 is transmitted to the main rotor 14 and the like via the belt 20A and the like, but the driving force from the engine 30 may be transmitted to the main rotor 14 and the like via other mechanical power transmission means such as a gear train.

REFERENCE SIGNS LIST 10 autonomous flying device
11 frame
12, 12A, 12B main frame
13, 13A, 13B, 13C, 13D sub frame
14, 14A, 14B main rotor
15, 15A, 15B, 15C, 15D sub rotor
16, 16A, 16B generator
17 casing
18 skid
19 body part
20, 20A, 20B belt
21, 21A, 21B, 21C, 21D motor
22 pulley
23 pulley
24, 24A, 24B, 24C, 24D driver 30 engine
31 arithmetic control device
32 inverter
33 excess electric power consumption circuit
34 capacitor module
40 first engine part
41 second engine part
42 first crankshaft
43 first piston
44 first connecting rod
45 second crankshaft
46 second piston
47 second connecting rod
48 combustion chamber
49 cylinder
60 first engine part
61 second engine part
62 first exhaust valve
63 second exhaust valve
64 first intake valve
65 second intake valve
66 cam shaft
67 cam pulley
68 reversing gear
70 first piston
71 first cylinder
72 second piston
73 second cylinder
74 timing belt
75 first connecting rod
76 second connecting rod
77 timing belt
78 first exhaust cam
79 second exhaust cam
80 first crankshaft
81 second crankshaft
82 crank pulley
83 crank pulley
84 first intake cam
85 cam pulley
86 cam shaft
87 second intake cam
88 flow path
89 flow path
100 crankshaft
101 balance mass
102 crank gear
103 connecting rod
104 piston
105 cylinder
106 balance mass
107 balancer shaft
109 balancer gear
110 flywheel
111 symmetry line

What is claimed is:

1. A method of operating an engine-mounted autonomous flying device comprising:
a first main rotor and a second main rotor that gives main thrust to a fuselage;
a plurality of sub rotors that controls orientation of the fuselage;
an engine that generates energy for rotating the first main rotor, the second main rotor and the plurality of sub rotors; and
an arithmetic control device that controls rotation of the plurality of sub rotors,
wherein the first main rotor and the second main rotor are rotated by being drivingly connected to the engine,
the plurality of sub rotors are rotated by a motor driven by electric power generated from a generator operated by the engine, and
wherein the method includes;
a step of hovering; and
a step of controlling orientation to tilt the fuselage,
wherein a rotational speed of the engine during the step of hovering and a rotational speed of the engine during the step of controlling orientation are substantially same,
wherein the arithmetic control device increases an output distribution ratio of the sub rotors during the step of controlling orientation to above an output distribution ratio of the sub rotors during the step of hovering, charges a capacitor or a battery during the step of hovering, and supplies electric power discharged by the capacitor or the battery to the motor during the step of controlling orientation,
wherein a step of controlling orientation to tilt the fuselage comprising increasing an output distribution ratio of at least one sub rotor of the plurality of sub rotors to above an output distribution ratio of the plurality of sub rotors when hovering by the arithmetic control device wherein the arithmetic control device sets the output distribution ratio of the at least one sub rotor of the plurality of sub rotors at 10% or more and 30% or less when the orientation control is performed,
wherein during the step of controlling orientation the autonomous flying device is tilted between 10 degrees to 35 degrees,
the plurality of sub rotors are each attached to a tip side of a respective sub arm extending outward from a portion where the engine is arranged, and
the first main rotor and the second main rotor are each attached to a tip side of a respective main arm extending outward from the portion where the engine is arranged, the main arm extending laterally in a horizontal direction from the fuselage,
when a direction in which a first engine part and a second engine part constituting the engine are arrayed is a first direction, and a direction which is perpendicular to the first direction is a second direction,
the first main rotor is driven by the first engine part and arranged on an outside along the first direction, and the second main rotor is driven by the second engine part and leveled at a position opposite the first main rotor, and
the plurality of sub rotors includes
on the first main rotor side, a first sub rotor arranged on the outside along the second direction, and a second sub rotor arranged along the second direction at a position opposite the first sub rotor, and
on the second main rotor side, a third sub rotor arranged on the outside along the second direction, and a fourth sub rotor arranged along the second direction at a position opposite the third sub rotor.

2. The method according to claim 1, wherein during the step of hovering the output distribution ratio of the first main rotor and the second main rotor combined and the plurality of sub rotors combined is 90%: 10%.

3. The method according to claim 1, wherein the first main rotor and the second main rotor rotate in opposite directions.

4. The method according to claim 1, wherein the first main rotor, the second main rotor and the plurality of sub rotors are arranged to be line-symmetric with respect to a left-right direction symmetry line passing the center of the fuselage along the left-right direction.

5. The method according to claim 4, wherein the first main rotor, the second main rotor and the plurality of sub rotors are arranged to be line-symmetric with respect to a front-rear direction symmetry line passing the center of the fuselage along the front-rear direction.

6. The method according to claim 1, wherein when viewed from above, the main rotor and the fuselage do not overlap.

7. The method according to claim 6, wherein when viewed from above, the center of rotation of the main rotor is positioned outside the fuselage.

8. A method of operating an engine-mounted autonomous flying device comprising:
a first main rotor and a second main rotor that gives main thrust to a fuselage; the first main rotor and the second main rotor rotate in opposite directions,
a plurality of sub rotors that controls orientation of the fuselage;
an engine that generates energy for rotating the first main rotor, the second main rotor and the plurality of sub rotors; and
an arithmetic control device that controls rotation of the plurality of sub rotors,
wherein the first main rotor and the second main rotor are rotated by being drivingly connected to the engine,
the plurality of sub rotors are rotated by a motor driven by electric power generated from a generator operated by the engine, and
wherein the method includes;
a step of hovering; and
a step of controlling orientation to tilt the fuselage,
wherein a rotational speed of the engine during the step of hovering and a rotational speed of the engine during the step of controlling orientation are substantially same,
wherein the arithmetic control device increases an output distribution ratio of the sub rotors during the step of controlling orientation to above an output distribution ratio of the sub rotors during the step of hovering, charges a capacitor or a battery during the step of hovering, and supplies electric power discharged by the capacitor or the battery to the motor during the step of controlling orientation,
when a direction in which a first engine part and a second engine part constituting the engine are arrayed is a first direction, and a direction which is perpendicular to the first direction is a second direction,
the first main rotor is driven by the first engine part and arranged on an outside along the first direction, and the second main rotor is driven by the second engine part and leveled at a position opposite the first main rotor, and
the plurality of sub rotors includes
on the first main rotor side, a first sub rotor arranged on the outside along the second direction, and a second sub rotor arranged along the second direction at a position opposite the first sub rotor, and
on the second main rotor side, a third sub rotor arranged on the outside along the second direction, and a fourth sub rotor arranged along the second direction at a position opposite the third sub rotor
wherein a step of controlling orientation to tilt the fuselage comprising increasing an output distribution ratio of at least one sub rotor of the plurality of sub rotors to above an output distribution ratio of the plurality of sub rotors when hovering by the arithmetic control device
wherein the arithmetic control device sets the output distribution ratio of the at least one sub rotor of the plurality of sub rotors at 10% or more and 30% or less when the orientation control is performed,
wherein during the step of controlling orientation the autonomous flying device is tilted between 10 degrees to 35 degrees
the plurality of sub rotors are each attached to a tip side of a respective sub arm extending outward from a portion where the engine is arranged, and
the first main rotor and the second main rotor are each attached to a tip side of a respective main arm extending outward from the portion where the engine is arranged, the main arm extending laterally in a horizontal direction from the fuselage,
when a direction in which a first engine part and a second engine part constituting the engine are arrayed is a first direction, and a direction which is perpendicular to the first direction is a second direction,
the first main rotor is driven by the first engine part and arranged on an outside along the first direction, and the second main rotor is driven by the second engine part and leveled at a position opposite the first main rotor.

9. The method according to claim 8, wherein the first main rotor, the second main rotor and the plurality of sub rotors are arranged to be line-symmetric with respect to a left-right direction symmetry line passing the center of the fuselage along the left-right direction.

10. The method according to claim 9, wherein the first main rotor, the second main rotor and the plurality of sub rotors are arranged to be line-symmetric with respect to a front-rear direction symmetry line passing the center of the fuselage along the front-rear direction.

11. The method according to claim 8, wherein when viewed from above, the sub rotor and the fuselage do not overlap.

12. The method according to claim 11, wherein when viewed from above, the center of rotation of the sub rotor is positioned outside the fuselage.

* * * * *